United States Patent [19]

Thomas

[11] Patent Number: 4,787,433
[45] Date of Patent: Nov. 29, 1988

[54] BEAD BREAKING DEVICE FOR TRACTOR TIRES

[76] Inventor: Charles M. Thomas, 215 N. A St., Morris, Okla. 74445

[21] Appl. No.: 925,291

[22] Filed: Oct. 31, 1986

[51] Int. Cl.⁴ .............................................. B60C 25/06
[52] U.S. Cl. .................................................. 157/1.17
[58] Field of Search .............................. 157/1.1, 1.17

[56] References Cited

U.S. PATENT DOCUMENTS

| 2,581,086 | 1/1952 | Edenfield et al. | 157/1.17 |
| 2,900,016 | 8/1959 | Woodward | 157/1.17 |
| 2,901,029 | 8/1959 | Mraz | 157/1.17 |
| 3,038,510 | 6/1962 | Vorkoeper et al. | 157/1.17 X |
| 3,537,501 | 11/1970 | Johnson | 157/1.17 |
| 4,256,161 | 3/1981 | Chisum | 157/1.17 |

*Primary Examiner*—Debra Meislin
*Attorney, Agent, or Firm*—William S. Dorman

[57] ABSTRACT

A manually operated hydraulic pump having been modified to break the circumferential bead of a pneumatic tire from a wheel rim, the hydraulic pump including a pump unit and a horizontally disposed cylinder having an internal piston rod, the pump unit being provided with a pivotal actuator wherein pivoting the actuator upwardly and downwardly urges the piston rod outwardly from the cylinder; the cylinder being provided with threads on its end being threadedly received in a barrel, the barrel including a wedge for inserting between the wheel rim and the sidewall of the tire, a locking member for securing the pump onto the wheel rim, the wedge comprising a stationary horseshoe-shaped plate surrounding a ram which is affixed to the end of the piston rod; whereby urging the piston rod outwardly from the cylinder presses the ram into the tire thereby breaking its bead.

3 Claims, 4 Drawing Sheets

4,787,433

BEAD BREAKING DEVICE FOR TRACTOR TIRES

BACKGROUND OF THE INVENTION

1. Field of the Invention

The present invention relates to a device for breaking the circumferential bead of a pneumatic tire. More particularly, the present invention relates to a bead breaking device for use on the oversized tires on the rear wheel of an agricultural tractor.

2. Prior Art

Agricultural tractors and the like are usually equipped with two very large tires on their rear wheel. A great deal of force must be applied to remove the large tractor tire from its rim. Generally, this operation is accomplished by the use of a hammer and mallet or by the use of relatively large specialized devices which often require the dismounting of tire and wheel rim from the tractor.

A preliminary search was conducted on the above, and the following prior art U.S. patents were uncovered:

| U.S. Pat. No. | Patentee | Issue Date |
|---|---|---|
| 2,122,388 | Wilkerson | June 28, 1938 |
| 2,606,602 | Manupello | May 25, 1950 |
| 2,520,330 | Northrup et al. | August 29, 1950 |
| 2,581,086 | Edenfield et al. | January 1, 1952 |
| 2,801,684 | Salsbury | September 2, 1954 |
| 2,775,290 | Monclaro | March 1, 1955 |
| 2,753,923 | Bowyer | July 10, 1956 |
| 3,537,501 | Johnson | November 3, 1970 |
| 3,574,318 | Gerbeth et al. | April 13, 1971 |
| 3,847,197 | Konen | November, 12, 1974 |
| 3,880,220 | Bunts | April 29, 1975 |
| 4,256,161 | Chisum | March 17, 1981 |

A tire bead forcing device is disclosed in U.S. Pat. No. 2,581,086 to Edenfield and includes a manually operated hydraulic pump. The tire is forced away from the wheel rim by means of a presser foot and the machine is fastened to the rim by a spring-loaded vise-like member. This device has an essentially canister type of hydraulic pump with the actuating means of the pump located on its rear end.

Another tire loosening tool having a large canister type pump is disclosed in U.S. Pat. No. 2,520,330 to Northrup et al. The clamping means of this invention comprises a lever style device with a handle which pivots a resilient pad which engages the wheel rim.

In U.S. Pat. No. 3,847,197 to Konen, a tire bead demounting apparatus having a relatively large jaw assembly is disclosed. This invention also includes a large arcuate yoke and requires an auxiliary source of pressure to power the plunger member in order to break the tire bead.

No prior art device discloses a compact device that does not require an auxiliary source of pressure. No self-contained prior art device disclosed is capable of being used in the confined space of the inner wall of the tire.

SUMMARY OF THE INVENTION

It is the object of the present invention to provide a bead breaking device for agricultural tractor tires that is self-contained and does not require the use of an auxiliary pressure source. It is a further object of the present invention to provide a compact device which is capable of being operated in the confined area between the inner wall of the tire and the main part of the tractor machinery. It is another object of the present invention to provide a device that is easy to operate and relatively inexpensive.

The bead breaking device of the present invention comprises a self-contained hand-operated hydraulic pump which has been modified in order to break the circumferential bead of a pneumatic tire. The present invention is generally used on the oversized rear tires of an agricultural tractor; however, it is readily applicable for use with other types of pneumatic tires. The pump is provided with a protective barrel or sheath into which the cylinder of the pump is threadedly inserted. The threaded connection between the sheath and the pump cylinder is relatively loose, allowing free 180° arcuate movement of the pump. The pump unit includes an actuator which is pivoted up and down by means of a handle which urges the internal piston rod in the pump cylinder forward.

The forward portion and the underneath portion of the pump cylinder is covered by the sheath. The forward end of the sheath is provided with a horseshoe-shaped plate surrounding a ram which is affixed to the forward end of the internal piston rod. The sheath is also provided with a pivotal locking member along its underneath portion, and includes a pivotal arm and a tightening screw.

To operate the present invention the locking arm is pivoted downwardly so that it will underlie the wheel rim of a tractor tire creating metal-to-metal contact; while simultaneously inserting the lower end of the plate and ram (which together act as a wedge) between the tire bead and the inside of the wheel rim. The screw of the locking member is tightened to secure the device to the wheel rim. The underneath portion of the sheath protects the pump cylinder from rupture by the screw. The handle is inserted into the actuator of the pump unit and the piston rod is pumped thereby urging the ram outwardly from the plate. The ram plate is generally urged forward approximately two inches from the plate in order to break the bead.

DETAILED DESCRIPTION OF THE PREFERRED EMBODIMENTS

Figure 1:
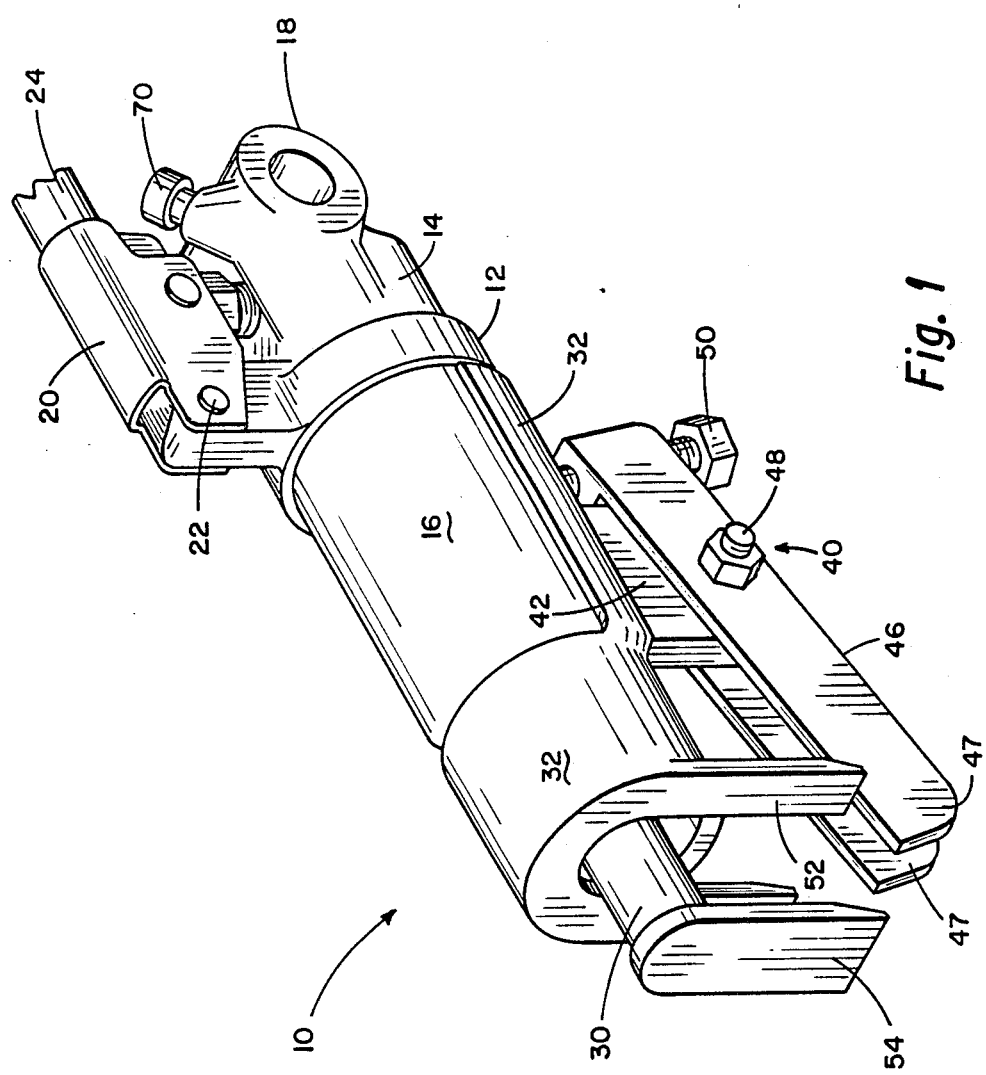
FIG. 1 is an isometric view of the bead breaking device of the present invention.

Referring to the drawings in detail, the bead breaking device 10 of the present invention comprises a self-contained hydraulic pump 12 which has been modified to break the circumferential bead of a pneumatic tire. Hydraulic pump 12 comprises a pump unit 14 having a forwardly extending horizontally disposed pump cylinder 16 and a rear eyelet 18. Pump unit 14 is provided with an actuator 20 which is pivoted upwardly and downwardly at a pivot point 22 by means of a handle 24. The handle is inserted into the end of actuator 20 during the operation of device 10 and is subsequently inserted and stored in eyelet 18 when the device is not in use. The parts of the hydraulic pump 12 form no part of the present invention but are described in relation to the modifications thereto.

Figure 2:
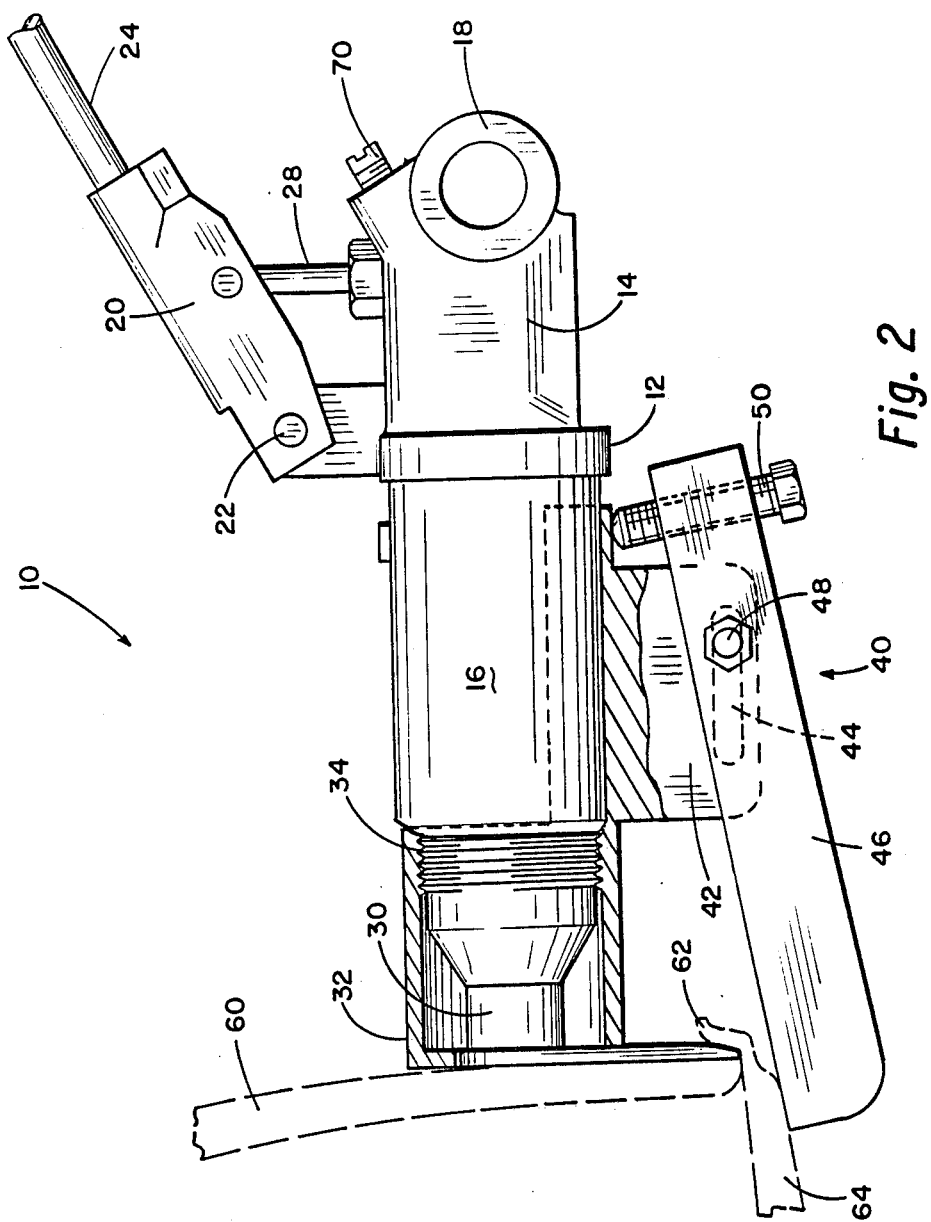
FIG. 2 is a side elevational view of the present invention with a portion being cut away showing the interior of the sheath.
Figure 3:
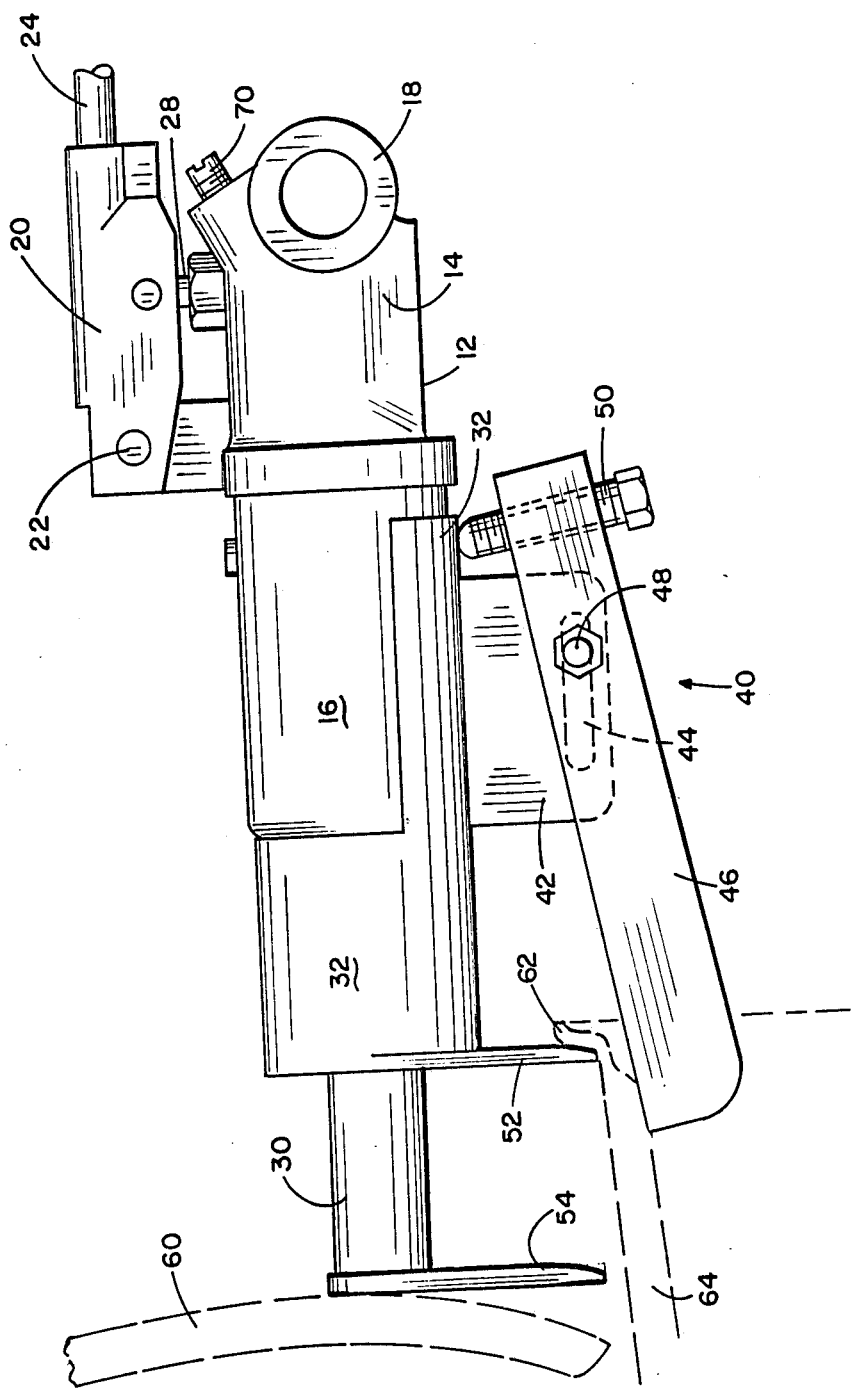
FIG. 3 is a side elevational view of the present invention showing the forward ram portion extended to break a tire bead.

The pivoting movement of actuator 20 causes a reciprocating motion in a pump piston 28 which increases the hydraulic pressure within the pump unit 14 and which subsequently urges the internal piston rod 30 housed in cylinder 16 outward from the forward portion of the device 10. The forward portion of the device comprises a protective barrel or sheath 32. As shown in FIG. 2, the cylinder 16 is provided with threads 34 and is thereby threadedly inserted into sheath 32. The threaded connection between the front end of the cylinder and the sheath is relatively loose, thus allowing the pump 12 to rotate freely in a 180° arc (or greater) with respect to the sheath 32 (see FIGS. 4 and 5).

As shown in the drawings, the sheath covers the underportion of the cylinder 16 and is provided with a pivotal locking member 40. The locking member is supported from a downwardly extending vertically disposed ear or bar 42 having a horizontally disposed adjustment slot 44. The pivotal locking member consists essentially of a pivotal locking arm 46 which is mounted on bar 42 by means of bolt 48. As best shown in FIG. 1, arm 46 includes two sides 47 disposed in spaced parallel relation wherein bar 42 is inserted therebetween. Bolt 48 passes through arm 46 and the slot 44, allowing the arm 46 to be slidably adjustable in relation to the bar. The arm pivots about the bolt and is provided with a locking screw 50, whose purpose will be disclosed hereinafter.

Figure 4:
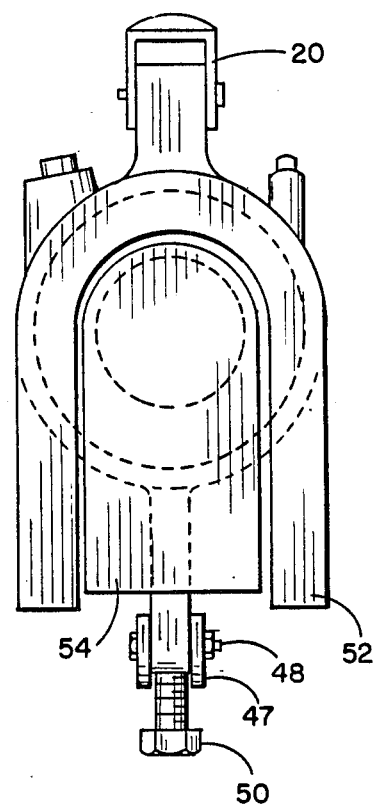
FIG. 4 is a front elevational view of the present invention with the actuator of the pump unit being in a vertical position.
Figure 5:
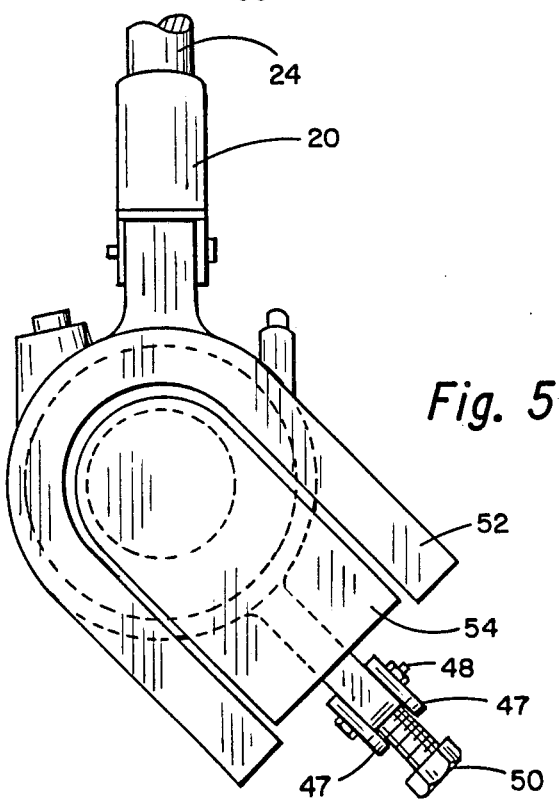
FIG. 5 is a front elevational view of the present invention showing the actuator being in a vertical position while the main body of the unit is angled.

The forward portion of the sheath 32 is provided with a horseshoe-shaped plate 52 surrounding a ram 54 which is affixed to the front end of the piston rod 30. As shown in FIGS. 2, 4, and 5, the ram and the horseshoe plate are in a closed position and thereby form a wedge.

THE OPERATION

To operate the bead breaking device 10 of the present invention, the lower end of the closed ram 54 and plate 52 are inserted or wedged between the sidewall of a tire 60 and the interior of the lip 62 of a wheel rim 64. Simultaneously, the locking arm 46 is pivoted downwardly to engage rim 64 and the locking screw 50 is tightened against the right-hand end of the sheath 32 to force the lower ends of the ram 54 and plate 52 against the bottom of the lip 62 and thereby securing the device to the wheel rim. The underneath portion of barrel or sheath 32 protects the cylinder 16 from being ruptured or damaged by screw 50.

The optimal position for the operation of the pump unit 14 is for the actuator 20 to be in a vertical position (see FIG. 5). If necessary, the pump 12 is rotated with respect to the sheath prior to the bead breaking operation. The pump can be rotated by inserting the handle 24 in eyelet 18 and turning the desired amount.

Referring to FIGS. 1 and 5, the handle 24 is inserted into the actuator 20 and is pumped, thereby urging the internal piston rod 30 and its attached ram 54 forward pressing against tire 60 until the bead is broken. Although the piston rod can be urged forward approximately four inches, generally a distance of two inches is sufficient to break the bead. During the operation the horseshoe plate remains stationary acting as an anchor or clamp for device 10. After the bead is broken, the hydraulic pressure is released by means of release valve 70 and the ram 52 is returned to the closed position with respect to plate 54 as shown in FIG. 2.

What is claimed is:

1. A device comprising a manually operated hydraulic pump having been modified to break the circumferential bead of a pneumatic tire from a wheel rim, said hydraulic pump including a pump unit having a horizontally disposed cylinder extending therefrom, said cylinder being provided with an internal piston rod, said pump unit being provided with a pivotal actuating member whereby pivoting said actuating member upwardly and downwardly urges said piston rod outwardly from said cylinder, and a means for releasing hydraulic pressure from said pump unit; said cylinder being provided with threads on the end opposite said pump unit, a barrel for threadedly receiving the threaded end of said cylinder, a ram portion being affixed to the end of said piston rod, said barrel including a stationary horseshoe-shaped plate surrounding said ram, said stationary plate and said ram constituting a wedge capable of being inserted between the interior of said wheel rim and a side wall of said pneumatic tire, and means for locking said device onto said wheel rim; whereby urging said piston rod outwardly from said cylinder presses said ram portion of said wedge into said side wall of said tire thereby breaking its bead; wherein said means for locking said device comprises a vertically disposed bar extending downwardly from said barrel and being provided with a horizontally disposed adjustment slot, a locking arm being pivotally mounted on said bar by means of a bolt passing through said slot, and a tightening screw mounted on said locking arm and having one end engagable with said barrel; whereby said arm is pivoted to engage said wheel rim and said screw is tightened against said barrel to secure said device on said wheel rim.

2. A device as set forth in claim 1 and being further characterized by the threaded connections between said cylinder and barrel being relatively loose thereby allowing said cylinder to freely rotate over at least a 180° degree arc with respect to said barrel.

3. A device as set forth in claim 1 and being further characterized by said stationary portion of said wedge comprising a horseshoe-shaped plate surrounding said ram portion.

* * * * *